US012591050B2

(12) United States Patent
Huang et al.

(10) Patent No.: US 12,591,050 B2
(45) Date of Patent: Mar. 31, 2026

(54) TIME OF FLIGHT RANGING SYSTEM AND RANGING METHOD THEREOF

(71) Applicant: SHANGHAI JUYOU SMART INTELLIGENCE TECHNOLOGY CO., LTD, Shanghai (CN)

(72) Inventors: Yongliang Huang, Shanghai (CN); Jian Mei, Shanghai (CN)

(73) Assignee: SHANGHAI JUYOU SMART INTELLIGENCE TECHNOLOGY CO., LTD, Shanghai (CN)

( * ) Notice: Subject to any disclaimer, the term of this patent is extended or adjusted under 35 U.S.C. 154(b) by 1074 days.

(21) Appl. No.: 17/637,587

(22) PCT Filed: Sep. 27, 2020

(86) PCT No.: PCT/CN2020/118133
§ 371 (c)(1),
(2) Date: Feb. 23, 2022

(87) PCT Pub. No.: WO2021/189794
PCT Pub. Date: Sep. 30, 2021

(65) Prior Publication Data
US 2022/0196810 A1     Jun. 23, 2022

(30) Foreign Application Priority Data

Mar. 25, 2020     (CN) .......................... 202010218423.6

(51) Int. Cl.
*G01S 7/48* (2006.01)
*G01S 7/4863* (2020.01)
(Continued)

(52) U.S. Cl.
CPC .......... *G01S 7/4865* (2013.01); *G01S 7/4863* (2013.01); *G01S 17/08* (2013.01); *G01S 17/894* (2020.01)

(58) Field of Classification Search
USPC ........................................................ 356/5.01
See application file for complete search history.

(56) References Cited

U.S. PATENT DOCUMENTS 11,092,678 B2 * 8/2021 Barnes ................... H04N 23/56
2012/0008128 A1 1/2012 Bamji
(Continued)

FOREIGN PATENT DOCUMENTS

CN     102741702 A     10/2012
CN     110632614 A     12/2019
CN     110688763 A     1/2020

*Primary Examiner* — James R Hulka
(74) *Attorney, Agent, or Firm* — FisherBroyles, LLP; Roger L. Browdy; James E. Mrose

(57) ABSTRACT

The present disclosure relates to a time of flight ranging system and a ranging method thereof, the ranging method comprising: performing scattering detection, and obtaining a scattering coefficient of each pixel unit in the sensing array, specifically comprising: emitting scattering detection light into a detection field of view, the detection field of view includes detected objects at different distances and is divided into a close-range area and a far-range area; obtaining a detection value of each pixel unit generated by reflected light and scattered light generated by the reflected light, calculating a ratio of the detection value generated by each pixel unit to a sum of the detection values generated by all pixel units of the entire sensing array as a pixel scattering coefficient corresponding to the pixel unit; performing distance measurement, and obtaining an initial measurement value output by each pixel unit; correcting initial measurement values output by at least part of the pixel units according to the scattering coefficients to obtain corrected measurement values; and calculating corrected measurement distance according to the corrected measurement val-
(Continued)

perform scattering detection and obtain a scattering coefficient of each pixel unit in the sensing array ~S101 perform distance measurement and obtain initial measurement values output by each pixel unit ~S102 correct, according to scattering coefficients, initial measurement values output by at least part of pixel units to obtain corrected measurement values ~S103 calculate corrected measurement distance according to corrected measurement values ~S104 ues. The ranging method can eliminate the influence of a close-range object on the measurement result to a far-range object.

12 Claims, 4 Drawing Sheets

(51) Int. Cl.

| *G01S 7/4865* | (2020.01) |
|---|---|
| *G01S 17/08* | (2006.01) |
| *G01S 17/894* | (2020.01) |

(56) References Cited

U.S. PATENT DOCUMENTS

| 2019/0391238 | A1* | 12/2019 | Barnes | G01S 7/4808 |
|---|---|---|---|---|
| 2020/0072946 | A1* | 3/2020 | Fisher | G01S 7/4863 |
| 2020/0284883 | A1* | 9/2020 | Ferreira | G01S 7/4815 |
| 2021/0302590 | A1* | 9/2021 | Minami | G01S 17/10 |

* cited by examiner

TIME OF FLIGHT RANGING SYSTEM AND RANGING METHOD THEREOF

TECHNICAL FIELD

The present disclosure relates to the field of sensing technology, in particular to a time of flight ranging system and a ranging method thereof.

BACKGROUND

Time of flight (TOF) detects a three-dimensional structure or a three-dimensional profile of a detected object by detecting the time interval of the pulse signal sent by the detecting instrument from transmission to reception or the phase difference produced by the laser going back and forth to the detected object once. TOF detecting instruments can obtain grayscale images and distance images at the same time, and are widely used in many fields such as somatosensory control, behavior analysis, monitoring, automatic driving, artificial intelligence, machine vision, and automatic 3D modeling.

A time of flight (TOF) sensor generally includes: a light source module and a photosensitive module; the light source module is used to emit pulsed detection light of a specific waveband and frequency, the detection light is reflected on the surface of the detected object, and the reflected light is received by the photosensitive module, the photosensitive module calculates distance information of the detected object according to the time difference or phase difference between the emitted light wave and the received light wave.

However, in the prior art, especially when the detection environment is relatively complicated, the detection result of the TOF sensor may produce relatively large errors. For example, when there are both a close object and a distant object in the detection field of view, the detected distance of the distant object will be relatively small. Moreover, the closer the close object is and the more pixels it occupies, the greater influence on the detected distance of the distant object.

How to further improve ranging accuracy and avoid the influence of close objects on the measurement accuracy of distant objects are problems that need to be solved urgently.

SUMMARY

The technical problem to be solved by the present disclosure is to provide a time of flight ranging system and a ranging method thereof to increase ranging accuracy.

In order to solve the above problem, the present disclosure provides a ranging method of a time of flight ranging system, the time of flight ranging system comprises a sensing array, the method comprising: performing scattering detection, and obtaining a scattering coefficient of each pixel unit in the sensing array, specifically comprising: emitting scattering detection light into a detection field of view, the detection field of view includes detected objects at different distances and is divided into a close-range area and a far-range area; obtaining a detection value in each pixel unit generated by reflected light and scattered light generated by the reflected light, calculating a ratio of the detection value generated by each pixel unit to a sum of the detection values generated by all pixel units of the entire sensing array as a pixel scattering coefficient corresponding to the pixel unit; performing distance measurement, and obtaining an initial measurement value output by each pixel unit; correcting initial measurement values output by at least part of the pixel units according to the scattering coefficients to obtain corrected measurement values; calculating corrected measurement distance according to the corrected measurement values.

Optionally, a method of obtaining a detection value in each pixel unit generated by reflected light and scattered light generated by the reflected light comprises: accumulating, in a charge accumulation window, electric charges generated by reception of pulses of the scattering detection light by each pixel unit of the sensing array after the pulses are reflected, to obtain the detection value generated by each pixel unit; the scattering detection light is pulsed light, and in a single pulse of the scattering detection light, part of the pulse overlaps with the charge accumulation window, and part of the pulse lags behind the charge accumulation window; the overlapped width of the pulse of the scattering detection light and the charge accumulation window is t, the distance range of the close-range area is $0\sim ct/2$, and the distance range of the far-range area is greater than $ct/2$.

Optionally, when the distance measurement is performed, distance measurement light with a pulse width of T is emitted, and the overlapped width t of the pulse of the scattering detection light and the charge accumulation window is in the range of $T/10\sim T/2$.

Optionally, the method for correcting the initial measurement value output by the pixel unit comprises: obtaining a sum $Q_{SUM}$ of the initial measurement values output by all the pixel units, an initial measurement value output by a pixel unit to be corrected is Q and its corresponding scattering coefficient is k, the corrected measurement value of the pixel unit is $Q'=Q-Q_{SUM}\cdot k$.

Optionally, initial measurement values output by pixel units corresponding to the far-range area are corrected; or initial measurement values output by pixel units corresponding to scattering coefficients less than a certain threshold are corrected.

Optionally, the distance measurement includes measurement of multiple distance measurement frames, and each distance measurement frame corresponds to at least one scattering detection.

Optionally, the scattering detection is performed before each distance measurement frame; or the distance measurement frame includes at least one close-range measurement subframe and at least one far-range measurement subframe, the scattering detection is performed between the close-range measurement subframe and the far-range measurement subframe, to correct initial measurement values output by at least part of the pixel units in the far-range measurement subframe.

A time of flight ranging system, comprising a light source module, a sensing array, and a charge accumulation circuit connected to the sensing array, characterized in that, further comprising a processing module, the processing module is configured to perform the following steps: perform scattering detection, and obtain a scattering coefficient of each pixel unit in the sensing array, which specifically includes: controlling the light source module to emit scattering detection light into the detection field of view, the detection field of view includes detected objects at different distances and is divided into a close-range area and a far-range area; obtaining a detection value of each pixel unit generated by reflected light and scattered light generated by the reflected light, and calculating a ratio of the detection value generated by each pixel unit to a sum of the detection values generated by all pixel units of the entire sensing array as a corresponding scattering coefficient of the pixel unit; perform distance measurement, and obtain an initial measurement value output by each pixel unit; according to the scattering coefficients, correct initial measurement values output by at least part of the pixel units to obtain corrected measurement values, calculate corrected measurement distance based on the corrected measurement values.

Optionally, the method for obtaining a detection value of each pixel unit generated by reflected light and scattered light generated by the reflected light includes: controlling the charge accumulation circuit to accumulate, in a charge accumulation window, electric charges generated by reception of pulses of the scattering detection light by each pixel unit of the sensing array after the pulses are reflected, to obtain the detection value generated by each pixel unit; the scattering detection light is pulsed light, and in a single pulse of the scattering detection light, part of the pulse overlaps with the charge accumulation window, and part of the pulse lags behind the charge accumulation window; the overlapped width of the pulse of the scattering detection light and the charge accumulation window is t, the distance range of the close-range area is $0\sim ct/2$, and the distance of the far-range area is greater than $ct/2$.

Optionally, when the distance measurement is performed, the light source module is controlled to emit distance measurement light with a pulse width of T, and the overlapped width t of the pulse of the scattering detection light and the charge accumulation window is in the range of $T/10\sim T/2$.

Optionally, the method for correcting an initial measurement value output by a pixel unit comprises: obtaining a sum $Q_{SUM}$ of initial measurement values output by all the pixel units and an initial measurement value Q output by a pixel unit to be corrected, the corresponding scattering coefficient is k, a corrected measurement value of the pixel unit is $Q'=Q-Q_{SUM}\cdot k$.

The time of flight ranging system according to claim 9, characterized in that, the processing module is configured to correct initial measurement values output by pixel units corresponding to the far-range area; or correct initial measurement values output by pixel units corresponding to scattering coefficients less than a certain threshold.

Optionally, the distance measurement includes measurement of multiple distance measurement frames; each distance measurement frame corresponds to at least one scattering detection.

Optionally, the scattering detection is performed before each distance measurement frame; or the distance measurement frame includes at least one close-range measurement subframe and at least one far-range measurement subframe, the scattering detection is performed between the close-range measurement subframe and the far-range measurement subframe, to correct initial measurement values output by at least part of the pixel units in the far-range measurement subframe.

The time of flight ranging method of the present disclosure obtains the scattering coefficient of each pixel unit through scattering detection, corrects the measurement distance of the pixel unit affected by a close-range object, and eliminates the influence of a close-range object on measurement distance of a far-range object to a certain extent, thereby reducing the systematic error caused by the lens structure to a certain extent.

DETAILED DESCRIPTION OF THE EMBODIMENTS

As mentioned in the background, when there are both a close object and a distant object in the detection field of view, there is often a large error in the measurement distance for the distant object.

The inventor found by research that because the reflected light of the close object to be detected will be received by the sensing array first, and due to the physical structure of a lens adopted by the ranging system, there will be a phenomenon of light scattering inside the lens, which is a system error determined by the physical structure of the lens and is difficult to be eliminated by a change of the lens structure. Moreover, at different angles, the effects of light scattering in the lens are also different, and it is difficult to correct the measurement results according to the physical structure of the lens.

The inventor found by further research that when reflected light of a close object is received by pixel units in the corresponding area through the lens, due to the scattering effect of the lens, part of the light will be received by pixel units in other areas, for example, received by pixel units corresponding to a distant object, which leads to the measurement distance of the distant object relatively small. Due to energy dissipation of light in its propagation process, the intensity of reflected light of a distant object is less than that of a close object, thus even though only a small part of the reflected light of the close object is scattered, the light intensity ratio is also relatively large as compared with the intensity of the reflected light of the distance object. Therefore, such influence on the measurement distance of the distant object cannot be ignored.

In order to solve the above problem, the inventor proposes a new time of flight ranging system and a ranging method thereof to correct the influence of scattered light on the measurement distance of a distant object.

The specific implementation of the time of flight ranging system and the ranging method thereof provided by the present disclosure will be described in detail below with reference to the accompanying drawings.

Figure 1:
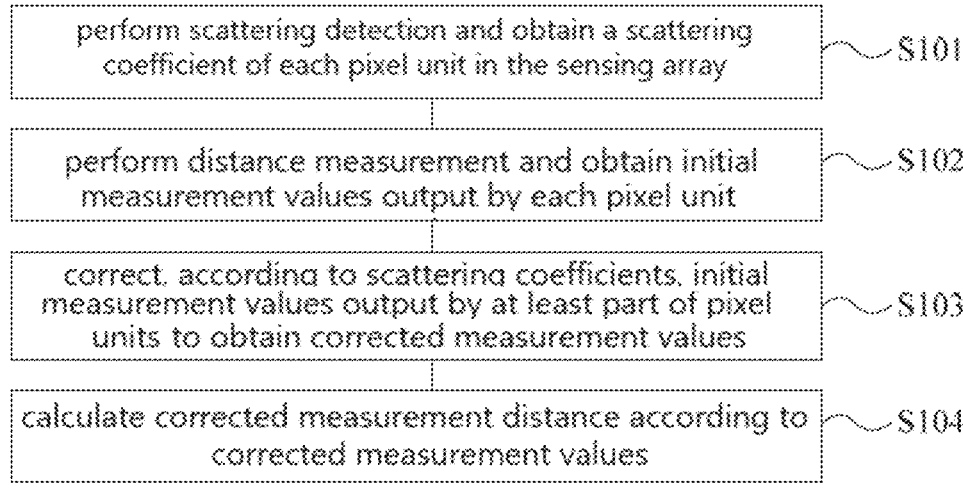
FIG. 1 is a schematic flowchart of a ranging method according to a specific embodiment of the present disclosure.

Please refer to FIG. 1, which is a schematic flowchart of a time of flight ranging method according to a specific embodiment of the present disclosure.

The ranging method comprises the following steps:

Step S101: perform scattering detection, and obtain a scattering coefficient of each pixel unit in the sensing array.

The time of flight ranging system comprises a sensing array, and the sensing array comprises multiple pixel units, that is optical sensing units, which can convert light signals into electric signals, so that the received reflected light can be converted into a certain amount of induced charges corresponding to the energy of the reflected light by the sensing array, and detection values corresponding to the energy of the reflected light can be accumulated and output through a shutter.

The time of flight ranging system further comprises a light source module for emitting detection light to the detected object. The detection light is modulated pulsed light, and the pulsed light may be easily modulated light such as LED light or laser, and all objects in the field of view of the time of flight ranging system are illuminated by the detection light. When the pulsed light reaches the surface of the detected object, it will be reflected by the surface of the detected object to form a pulsed reflected light signal; at the same time, there is ambient light in the environment where the detected object is located. In an actual use scenario, the light signal obtained by the time of flight sensing system through the sensing array includes both pulsed reflected light and ambient light. In the description of subsequent specific embodiments, the reflected light received by the sensing array includes both pulsed reflected light and ambient light. In other specific embodiments, the detection light may also be a modulated sine wave, square wave, etc. with a certain period.

Due to the scattering of the lens itself, in an actual detection process, the light signal received by each pixel unit includes, besides the reflected light of the detected object at the corresponding position, scattered light of reflected light at other positions after being scattered by the lens. Generally, because the reflected light of a close object has a higher intensity than that of a distant object, the generated scattered light will affect detection values of other pixel units after reaching these pixel units. Therefore, the error of distance measurement caused by scattered light is mainly caused by scattering of the reflected light from a close object.

In a specific embodiment of the present disclosure, the method for obtaining the scattering coefficient of each pixel unit comprises: emitting scattering detection light into the detection field of view, the detection field of view includes detected objects at different distances, and the detection field of view includes a close-range area and a far-range area respectively corresponding to detected objects in different distance ranges; obtaining a detection value in each pixel unit generated by the reflected light and the scattered light generated by the reflected light.

The range of detectable distance in the detection field of view is 0 to L. According to the influence of the scattered light, the detection field of view is divided into a close-range area and a far-range area. The close-range area is an area in which the distance between an object and the TOF lens is 0 to ct/2, and the far-range area refers to an area in which the distance between the detected object and the TOF lens is greater than ct/2. Since the light intensity will gradually attenuate as the light propagates, the reflected light from the detected object of a longer range has a smaller light intensity when it reaches the sensing array, even if it is scattered by the lens, it will have little influence on the detection result; therefore, in the specific embodiments of the present disclosure, only the influence of a close-range object on the detection result of a far-range object is corrected.

Figure 2:
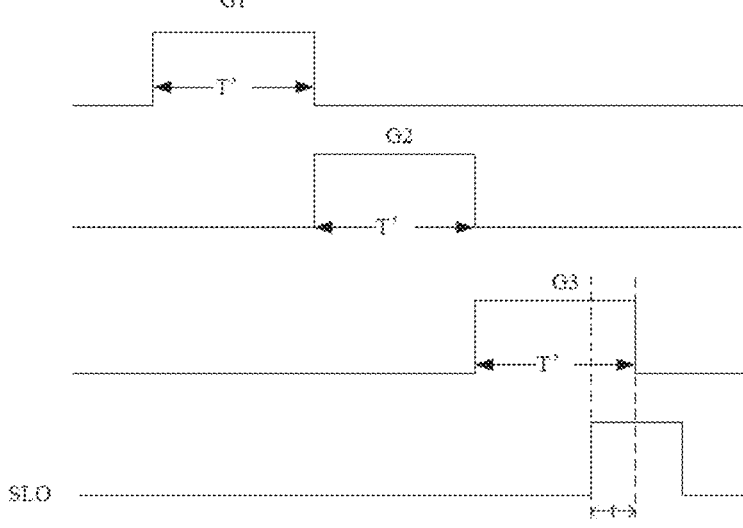
FIG. 2 is a schematic timing diagram of scattering detection light and charge accumulation windows during a scattering detection process according to a specific embodiment of the present disclosure.

Please refer to FIG. 2, which is a schematic timing diagram of scattering detection light and charge accumulation windows during a scattering detection in a specific embodiment of the present disclosure.

In the ranging process using the time of flight ranging system, charges generated by each pixel unit in the sensing array are usually accumulated within three consecutive charge accumulation windows, which are respectively charge accumulation windows G1 to G3. The charge accumulation window G1 is used to accumulate induced charges generated by ambient light, and the charge accumulation windows G2 and G3 accumulate induced charges generated by the reflected light (including the ambient light) according to the sequence.

During the scattering detection, the charge accumulation windows in the distance measurement can be used without any changes. During the scattering detection, the width of the charge accumulation windows G1 to G3 is T'. Emit scattering detection light SLO, and accumulate electric charges generated by reception of each pixel unit of the sensing array after the pulses of the scattering detection light are reflected in the charge accumulation window G3, so as to obtain a detection value Qs output by each pixel unit. In order to ensure that the accumulated charges are all induced charges generated by the reflected light and its scattered light of a detected object of close range, in this specific embodiment, the scattering detection light STO is pulsed light, and in a single pulse of the scattering detection light STO, part of the pulse overlaps with the charge accumulation window G3, and part of the pulse lags behind the charge accumulation window G3, and the width of the overlapped portion is t. Due to the width of the overlapped portion is relatively small, the charge accumulation window G3 can only accumulate induced charges generated by the light reflected by close-range objects after it is received by the pixel units. Specifically, charges generated after the scattering detection light is reflected by an object within the distance of 0~ct/2 can be accumulated in the charge accumulation window G3. In this specific embodiment, the distance range of the close-range area is 0 to ct/2, and the distance range of the far-range area is ct/2 to L, and L is the range of distance measurement. The width t of the overlapped portion can be adjusted according to the division of the close-range area and the far-range area. Since the reflected light of a distant object attenuates more during the propagation, the intensity of its scattered light reaching the sensing array is weaker, and the impact on the detection result can be ignored. If the pulse width of the distance measurement light corresponding to range L is T, then in some specific embodiments, $$\frac{T}{10} \le t \le \frac{T}{2},$$

preferably t=T/7.

In this specific embodiment, the charge accumulation windows G1 to G3 can be kept consistent with the time sequence of the distance measurement process, so that in the subsequent distance measurement, only parameters of the emitted detection light need to be adjusted. In other specific embodiments, the charge accumulation window G1 or G2 may be closed during the scattering detection.

In other specific embodiments, the charge accumulation window G1 or the charge accumulation window G2 may be used for charge accumulation as scattering detection frames, and the timing of the scattering detection light needs to be adjusted accordingly.

Figure 3:
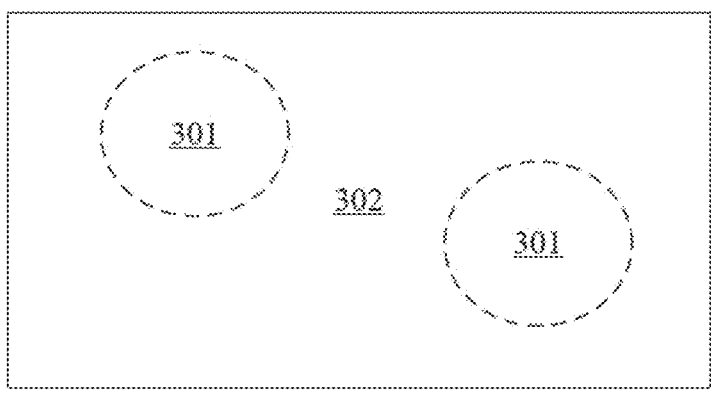
FIG. 3 is a schematic diagram of a correspondence between a sensing array and a close-range area and a far-range area according to a specific embodiment of the present disclosure.

Please refer to FIG. 3, as an example, sensing areas 301 in the sensing array correspond to close-range areas, in which the distance between the detected object and the TOF lens is 0~ct/2; a sensing area 302 corresponds to the far-range area, in which the distance between the detected object and the TOF lens is greater than ct/2. In the absence of lens scattering and no consideration of ambient light, in the charge accumulation window G3, only pixel units in the sensing areas 301 can generate the detection value Qs, while pixel units in the sensing area 302 will not generate induced electric charge of the scattering detection light. However, in an actual detection process, due to the scattering effect of the lens on the reflected light, part of the reflected light corresponding to the sensing areas 301 is scattered and received by the pixel units in the sensing area 302. Therefore, the detection values generated by the pixel units in the sensing area 302 are all generated by the scattered light, so that the scattering coefficients k of the pixel units in the sensing area 302 corresponding to the far-range area can be calculated.

The pixel units of the sensing array are arranged in m rows and n columns; the scattering coefficient of the pixel unit in the i-th row and the j-th column is k(i,j), $$k(i, j) = \frac{Q_s(i, j)}{\sum\limits_{i=1}^{m} \sum\limits_{j=1}^{n} Q_s(i, j)}$$

Before the actual distance measurement is performed, it is impossible to determine the specific positions of the pixel units corresponding to the close-range area and the far-range area in the sensing array, therefore, the detection values Qs output by all the pixel units in the sensing array can be calculated as described above to obtain the scattering coefficients of all pixel units, and only the scattering coefficients of the pixel units in the sensing area corresponding to the far-range area are effective scattering coefficients.

When the ambient light is considered, the actual detection value Qs=Q3−Q1, wherein Q3 is the detection value obtained by the charge accumulation window G3 in the scattering detection stage, and Q1 is the detection value obtained by the charge accumulation window G1 in the scattering detection stage.

Figure 4A:
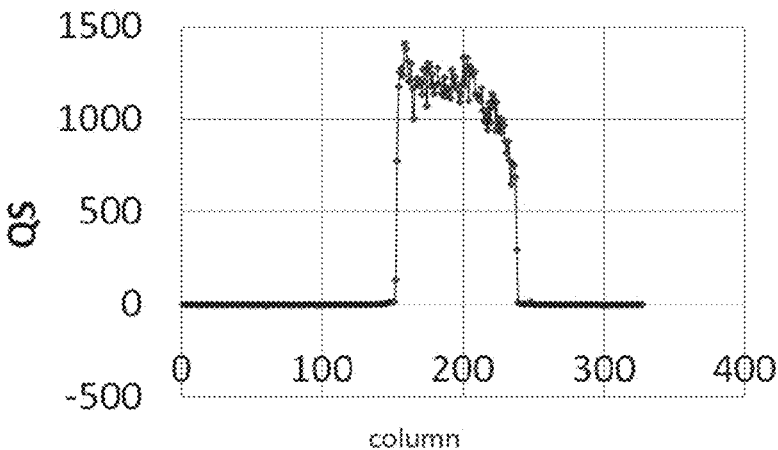
FIG. 4a is a distribution diagram of detection values obtained in a scattering detection process according to a specific embodiment of the present disclosure.
Figure 4B:
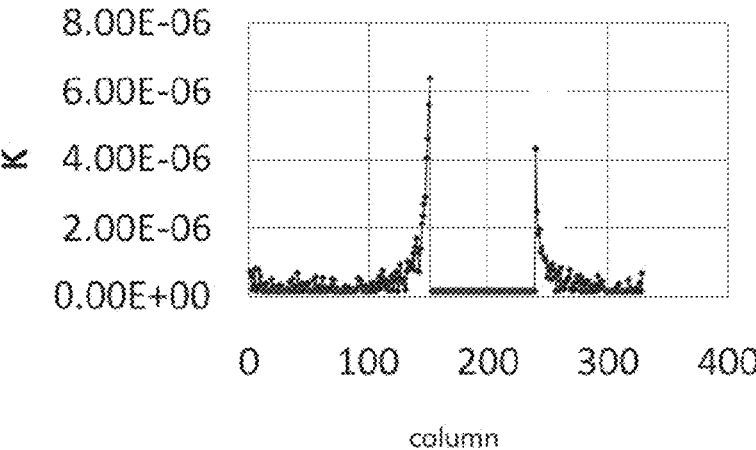
FIG. 4b is a distribution diagram of scattering coefficients obtained in a scattering detection process according to a specific embodiment of the present disclosure.

Please refer to FIG. 4a and FIG. 4b, which are data distribution diagrams of the detection value Qs output by each pixel unit in a certain row of pixel units and the corresponding scattering coefficient k during the scatter detection in a specific embodiment.

Refer to FIG. 4a, the area with a higher Qs value corresponds to the close-range area, and the area with a lower Qs value is the far-range area where the pixel units are affected by the close-range area. Correspondingly, in FIG. 4b, smaller scattering coefficients k corresponding to the far-range area are the effective scattering coefficients.

Step S102: perform distance measurement, and obtain an initial measurement value of each pixel unit.

After the effective scattering coefficients are obtained, distance measurement is performed.

Figure 5:
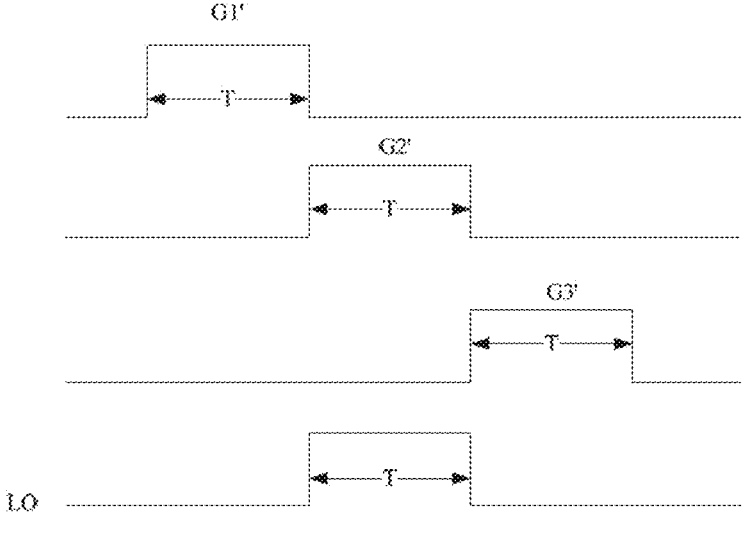
FIG. 5 is a schematic timing diagram of distance measurement light and charge accumulation windows during distance measurement according to a specific embodiment of the present disclosure.

Please refer to FIG. 5, which is a schematic timing diagram of charge accumulation windows G1'-G3' and distance measurement light LO used in the distance measurement process.

The charge accumulation windows G1'~G3' are used to accumulate initial measurement values Q1(i,j), Q2(i,j) and Q3(i,j) output by each pixel unit, respectively. The window width corresponding to the charge accumulation windows G1'~G3' during the distance measurement is T', wherein the charge accumulation window G1' is used to accumulate induced charges generated by the ambient light, and the charge accumulation windows G2' and G3' accumulate induced charges generated by the reflected light (including ambient light) of the distance measurement light LO from the detected object according to the sequence. The window width of the charge accumulation windows G1' to G3' are the same as the pulse width of the distance measurement light LO, and both are T. T can be the same as or different from the window width T' of G1 to G3 during the scattering detection process.

Step S103: According to the scattering coefficients, correct the initial measurement values output by at least part of the pixel units to obtain the corrected measurement values.

The method for correcting the initial measurement values corresponding to the charge accumulation windows output by each pixel unit includes: obtaining a sum $Q_{SUM}$ of the initial measurement values output by all pixel units, the initial measurement value output by the pixel unit to be corrected is Q and the corresponding scattering coefficient is k, the corrected measurement value of the pixel unit Q'=Q−$Q_{SUM}$k.

Specifically, the calculation method for the correction of the output initial measurement values Q1, Q2, and Q3 is:

$$Q1'(i, j) = Q1(i, j) - k(i, j) \sum\limits_{i=1}^{m} \sum\limits_{j=1}^{n} Q1(i, j)$$

$$Q2'(i, j) = Q2(i, j) - k(i, j) \sum\limits_{i=1}^{m} \sum\limits_{j=1}^{n} Q2(i, j)$$

$$Q3'(i, j) = Q3(i, j) - k(i, j) \sum\limits_{i=1}^{m} \sum\limits_{j=1}^{n} Q3(i, j)$$

In an actual correction process, only initial measurement values output by the pixel units that are greatly affected by the scattering of the reflected light from the close-range area need to be corrected.

In a specific implementation, only initial measurement values output by pixel units corresponding to the far-range area may be corrected. The initial measurement distance can be calculated from the initial measurement value output by each pixel unit. Although the initial measurement distance may have a certain error, it can basically reflect a distance distribution of objects in the detection field of view, so as to determine sensing regions corresponding to the close-range area and the far-range area respectively, thereby determining the positions of the pixel units corresponding to the far-range area. During the correction process, only initial measurement values output by pixel units corresponding to the far-range area (the initial measurement distance is within the range of ct/2~L) are corrected, and an initial measurement value output by a pixel unit corresponding to the close-range area is directly used as a corrected measurement value.

Since the proportion of scattered light is relatively small, the effective scattering coefficient usually has a relatively small value. For pixel units corresponding to the close-range area, during the scattering detection, the close-range area can receive the reflected light, so the calculated scattering coefficients have relatively large values, but they do not reflect the degree of influence of the scattered light, which are invalid scattering coefficients. Therefore, a threshold can be set, and a scattering coefficient smaller than the threshold is regarded as an effective scattering coefficient, and a scattering coefficient greater than or equal to the threshold is regarded as an invalid scattering coefficient. In another specific embodiment, only initial measurement values output by pixel units whose scattering coefficients are less than the threshold may be corrected. The range of the threshold may be 1E-7 to 1E-3, for example, the value of the threshold is 1E-5. An initial measurement value output by a pixel unit whose scattering coefficient is greater than or equal to the threshold can be directly used as a corrected measurement value.

Step S104: Calculate the corrected measurement distance according to the corrected measurement values.

Obtain the corrected measurement distance S'(i,j) according to the corrected measurement value of each pixel unit, $$S'(i, j) = \frac{cT}{2} \cdot \frac{Q3'(i, j) - Q2'(i, j)}{Q3'(i, j) + Q2'(i, j) - 2Q1'(i, j)}$$

Above, only a single charge accumulation period is taken as an example. In other specific embodiments, each scattering detection frame and distance measurement frame may include multiple charge accumulation periods, and the detection value corresponds to the sum of the detection values obtained by the multiple charge accumulation periods, and the initial measurement value corresponds to the sum of the initial measurement values obtained in the multiple charge accumulation periods.

For real-time distance measurement, it is necessary to measure the distance of an object in the detection field of view in real time, especially when there is a moving object in the detection field of view, the close-range area and the far-range area change in real time, and the scattering coefficient corresponding to each pixel unit also changes accordingly. Therefore, the distance measurement process usually includes the measurement of multiple distance measurement frames, and each distance measurement frame corresponds to one scattering detection.

Figure 6:
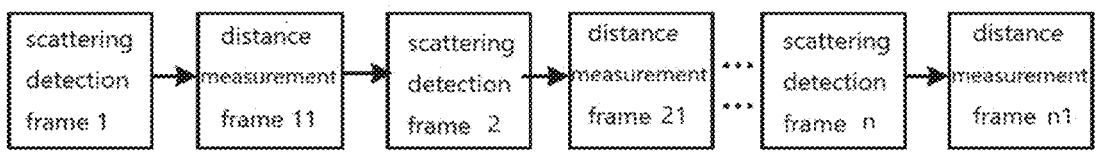
FIG. 6 is a schematic diagram of a sequence of distance measurement frames and scattering detection frames during distance measurement according to a specific embodiment of the present disclosure.

Please refer to FIG. 6, which is a schematic flowchart of a ranging method according to a specific embodiment of the present disclosure.

The entire process of distance measurement includes n frames of distance measurement frames and n frames of scattering detection frames; before the measurement of the distance measurement frame, the scattering coefficient of each pixel unit is detected through the scattering detection frame, so as to correct the initial measurement value obtained by the distance measurement frame to obtain the corrected measurement distance corresponding to each distance measurement frame. Specifically, the detection of a scattering detection frame 1 is performed before a distance measurement frame 11, the detection of a scattering detection frame 2 is performed before a distance measurement frame 21, and the detection of a scattering detection frame n is performed before a distance measurement frame n1.

In other specific embodiments, for a high dynamic (HDR) measurement scene, the distance measurement frames may also include at least one close-range measurement subframe and at least one far-range measurement subframe. By adjusting measurement parameters, the close-range measurement subframe has higher measurement accuracy for the close-range area, while the far-range measurement subframe has higher measurement accuracy for the far-range area. For example, the charge accumulation period in the close-range measurement subframe is shorter, and the charge accumulation period in the far-range measurement subframe is relatively longer; or the light intensity of the close-range measurement subframe is less than that of the far-range measurement subframe, etc., which are not limited here.

The final measurement distance is obtained by combining the data of the close-range measurement subframe and the far-range measurement subframe. Since the close-range measurement subframe is mainly used to provide distance measurement data of the close-range area, and pixel units corresponding to the close-range area are less affected by scattering, there is no need to correct the data; while the far-range measurement subframe is mainly used to provide distance measurement data of the far-range area, which is greatly affected by scattering and needs to be corrected.

Figure 7:
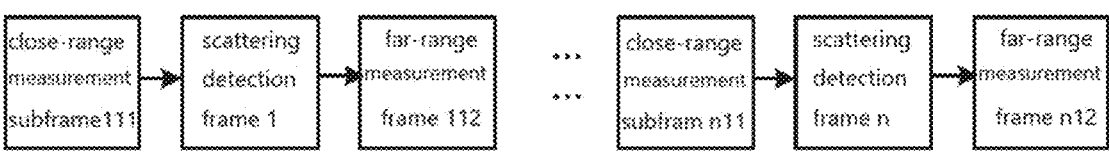
FIG. 7 is a schematic diagram of a sequence of measurement subframes and scattering detection frames under highly dynamic ranging according to a specific embodiment of the present disclosure.

Please refer to FIG. 7, which is a schematic diagram of a sequence of measurement subframes and scattering detection frames under high dynamic ranging according to a specific embodiment.

Each distance measurement frame includes a close-range measurement subframe and a far-range measurement subframe. Between the close-range measurement subframe and the far-range measurement subframe, detection of a scattering detection frame is performed. After the scattering coefficient of each pixel unit is obtained, the initial measurement distance obtained in the subsequent far-range measurement subframe is corrected to obtain the corrected measurement distance of the far-range measurement; then the data is combined with the measurement distance obtained in the close-range measurement subframe to obtain the corrected measurement distance under high dynamic (HDR) measurement.

Specifically, the first distance measurement frame includes a close-range measurement subframe 111 and a far-range measurement subframe 112, and between the close-range subframe 111 and the far-range measurement subframe 112, detection of a scattering detection frame 1 is performed. The n-th distance measurement frame includes a close-range measurement subframe n11 and a far-range measurement subframe n12, and between the close-range subframe n11 and the far-range measurement subframe n12, detection of a scattering detection frame n is performed.

The above-described time of flight ranging method uses scattering detection to obtain the scattering coefficient of each pixel unit, and corrects the measurement distance of the pixel unit affected by close-range objects, which eliminates, to a certain extent, the influence of close-range objects on the measurement distance of far-range objects, thereby reducing the system error caused by the lens structure to a certain extent.

The specific embodiment of the present disclosure also provides a time of flight ranging system.

Figure 8:
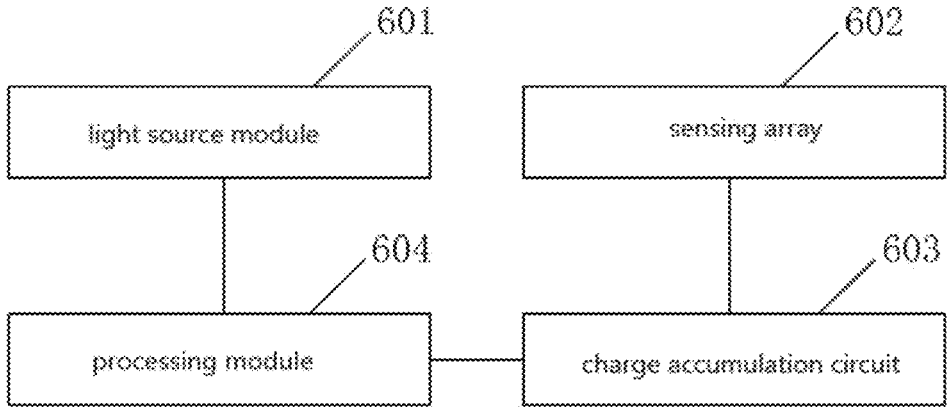
FIG. 8 is a schematic structural diagram of a time of flight ranging system according to a specific embodiment of the present disclosure.

Please refer to FIG. 8, the time of flight ranging system comprises: a light source module 601, a sensing array 602, a charge accumulation circuit 603 connected to the sensing array, and a processing module 604.

The light source module 601 is used to emit detection light to the detected object. The detection light is modulated pulsed light, and the pulsed light may be easily modulated light such as LED light or laser, and all objects in the field of view of the time of flight ranging system are illuminated by the detection light. When the pulsed light reaches the surface of the detected object, it will be reflected on the surface of the detected object to form a pulsed reflected light signal; at the same time, there is ambient light in the environment where the detected object is located. In an actual use scenario, the optical signal obtained by the time of flight sensor through the optical sensing pixel array includes both pulsed reflected light and ambient light. In the description of subsequent specific embodiments, reflected light received by the optical sensing pixel array includes both pulsed reflected light and ambient light. In other specific embodiments, the detection light may also be a modulated sine wave, a square wave and the like with a certain period.

The sensing array 602 includes a plurality of pixel units arranged in an array, and each pixel unit is used to receive reflected light and generate induced charges. The charge accumulation circuit 603 is connected to the sensing array 602, and is used to accumulate induced charges generated by each pixel unit to form a detection signal corresponding to the light energy, which is converted into a detection value through processing.

The processing module 604 is connected to the light source module 601 and the charge accumulation circuit 603, and is used to control light-emitting parameters of the light source module 601, and obtain the detection signal obtained by the charge accumulation circuit 603 and process it to obtain a detection value.

Specifically, the processing module 604 is configured to perform the following steps: perform scattering detection, and obtain a scattering coefficient of each pixel unit in the sensing array, which specifically includes: controlling the light source module to emit scattering detection light into the detection field of view, the detection field of view includes detected objects at different distances and is divided into a close-range area and a far-range area; obtaining a detection value generated by each pixel unit by receiving the reflected light from the close-range area; obtaining a detection value of each pixel unit generated by the reflected light and the scattered light generated by the reflected light, and calculating a ratio of the detection value generated by each pixel unit to a sum of the detection values generated by all pixel units of the entire sensing array as the corresponding scattering coefficient of the pixel unit; perform distance measurement, and obtain an initial measurement value output by each pixel unit; according to the scattering coefficients, correct the initial measurement values output by at least part of the pixel units to obtain corrected measurement values; calculate corrected measurement distance based on the corrected measurement values.

Preferably, the method for obtaining a detection value of each pixel unit generated by the reflected light and the scattered light generated by the reflected light includes: controlling the charge accumulation circuit to accumulate, in the charge accumulation window, electric charges generated by reception of pulses of the scattering detection light by each pixel unit of the sensing array after the pulses are reflected, to obtain a detection value generated by each pixel unit; the scattering detection light is pulsed light, and in a single pulse of the scattering detection light, part of the pulse overlaps with the charge accumulation window, and part of the pulse lags behind the charge accumulation window; the overlapped width of the pulse of the scattering detection light and the charge accumulation window is t, the distance range of the close-range area is 0~ct/2, and the distance of the far-range area is greater than ct/2.

Preferably, when the distance measurement is performed, the light source module is controlled to emit distance measurement light with a pulse width of T, and the overlapped width t of the pulse of the scattering detection light and the charge accumulation window is in the range of T/10~T/2.

Preferably, the method for correcting the initial measurement value output by the pixel unit includes: obtaining the sum $Q_{SUM}$ of the initial measurement values output by all the pixel units and the initial measurement value Q output by the pixel unit to be corrected, the scattering coefficient corresponding to the pixel is k, and the corrected measurement value $Q'=Q-Q_{SUM} \cdot k$.

In some specific embodiments, the processing module is configured to correct initial measurement values output by the pixel units corresponding to the far-range area, in other specific embodiments, the processing module is configured to correct initial measurement values output by the pixel units whose scattering coefficients are less than a certain threshold.

In some specific embodiments, the distance measurement frame includes measurement of multiple distance measurement frames; and each distance measurement frame corresponds to one scattering detection. Scattering detection is performed before each distance measurement frame. Preferably, a scattering detection can be performed before each distance measurement frame.

In some specific implementations, the distance measurement frame includes at least one close-range measurement subframe and at least one far-range measurement subframe. A scattering detection is performed between the close-range measurement subframe and the far-range measurement subframe, to correct the initial measurement values output by at least part of the pixel units in the far-range measurement subframe.

The above are only the preferred embodiments of the present disclosure. It should be pointed out that for those of ordinary skill in the art, without departing from the principle of the present disclosure, several improvements and modifications can be made, and these improvements and modifications should also be considered as the protection scope of the present disclosure.

What is claimed is:

1. A ranging method of a time of flight ranging system, the time of flight ranging system comprises a sensing array, the method comprising:

performing scattering detection, and obtaining a scattering coefficient of each pixel unit in the sensing array, specifically comprising: emitting scattering detection light into a detection field of view, the detection field of view includes detected objects at different distances and is divided into a close-range area and a far-range area; obtaining a detection value of each pixel unit generated by reflected light and scattered light generated by the reflected light, calculating a ratio of the detection value generated by each pixel unit to a sum of the detection values generated by all pixel units of the entire sensing array as a scattering coefficient corresponding to the pixel unit;

performing distance measurement, and obtaining an initial measurement value output by each pixel unit;

correcting, according to the scattering coefficients, initial measurement values output by at least part of the pixel units to obtain corrected measurement values;

13

14 calculating corrected measurement distance according to the corrected measurement values;

wherein obtaining the detection value of each pixel unit generated by reflected light and scattered light generated by the reflected light comprises:

accumulating, in a charge accumulation window, in a charge accumulation window, electric charges generated by reception of pulses of the scattering detection light by each pixel unit of the sensing array after the pulses are reflected, to obtain the detection value generated by each pixel unit; the scattering detection light is pulsed light, and in a single pulse of the scattering detection light, part of the pulse overlaps with the charge accumulation window, and part of the pulse lags behind the charge accumulation window; the overlapped width of the pulse of the scattering detection light and the charge accumulation window is t, the distance range of the close-range area is 0~ct/2, and the distance range of the far-range area is greater than ct/2.

2. The ranging method of a time of flight ranging system according to claim 1, wherein, when the distance measurement is performed, distance measurement light with a pulse width of T is emitted, and the overlapped width t of the pulse of the scattering detection light and the charge accumulation window is in the range of T/10~T/2.

3. The ranging method of a time of flight ranging system according to claim 1, wherein the method of correcting the initial measurement value output by the pixel unit comprises obtaining a sum $Q_{SUM}$ of the initial measurement values output by all the pixel units, an initial measurement value output by a pixel unit to be corrected is Q and its corresponding scattering coefficient is k, and the corrected measurement value of the pixel unit is $Q'=Q-Q_{SUM} \cdot k$.

4. The ranging method of a time of flight ranging system according to claim 1, wherein initial measurement values output by pixel units corresponding to the far-range area are corrected; or initial measurement values output by pixel units corresponding to scattering coefficients less than a certain threshold are corrected.

5. The ranging method of a time of flight ranging system according to claim 1, wherein the distance measurement includes measurement of multiple distance measurement frames, and each distance measurement frame corresponds to at least one scattering detection.

6. The ranging method of a time of flight ranging system according to claim 5, wherein the scattering detection is performed before each distance measurement frame; or the distance measurement frame includes at least one close-range measurement subframe and at least one far-range measurement subframe, the scattering detection is performed between the close-range measurement subframe and the far-range measurement subframe, and initial measurement values output by at least part of the pixel units in the far-range measurement subframe are corrected.

7. A time of flight ranging system, comprising a light source module, a sensing array, a charge accumulation circuit connected to the sensing array, and a processing module, the processing module being configured to perform the following steps:

perform scattering detection, and obtain a scattering coefficient of each pixel unit in the sensing array, which specifically includes: controlling the light source module to emit scattering detection light into a detection field of view, the detection field of view includes detected objects at different distances and is divided into a close-range area and a far-range area; obtain a detection value of each pixel unit generated by reflected light and scattered light generated by the reflected light, and calculate a ratio of the detection value generated by each pixel unit to a sum of the detection values generated by all pixel units of the entire sensing array as a corresponding scattering coefficient of the pixel unit;

perform distance measurement, and obtain an initial measurement value output by each pixel unit;

correct, according to the scattering coefficients, initial measurement values output by at least part of the pixel units to obtain corrected measurement values;

calculate corrected measurement distance based on the corrected measurement values;

wherein the method for obtaining a detection value of each pixel unit generated by reflected light and scattered light generated by the reflected light includes: controlling the charge accumulation circuit to accumulate, in a charge accumulation window, electric charges generated by reception of pulses of the scattering detection light by each pixel unit of the sensing array after the pulses are reflected, to obtain the detection value generated by each pixel unit; the scattering detection light is pulsed light, and in a single pulse of the scattering detection light, part of the pulse overlaps with the charge accumulation window, and part of the pulse lags behind the charge accumulation window; the overlapped width of the pulse of the scattering detection light and the charge accumulation window is t, the distance range of the close-range area is 0~ct/2, and the distance of the far-range area is greater than ct/2.

8. The time of flight ranging system according to claim 7, wherein, when the distance measurement is performed, the light source module is controlled to emit distance measurement light with a pulse width of T, and the overlapped width t of the pulse of the scattering detection light and the charge accumulation window is in the range of T/10~T/2.

9. The time of flight ranging system according to claim 7, wherein the method for correcting an initial measurement value output by a pixel unit comprises obtaining a sum $Q_{SUM}$ of initial measurement values output by all the pixel units and an initial measurement value Q output by a pixel unit to be corrected, the corresponding scattering coefficient is k, and a corrected measurement value of the pixel unit is $Q'=Q-Q_{SUM} \cdot k$.

10. The time of flight ranging system according to claim 7, wherein the processing module is configured to correct initial measurement values output by pixel units corresponding to the far-range area; or correct initial measurement values output by pixel units corresponding to scattering coefficients less than a certain threshold.

11. The time of flight ranging system according to claim 7, wherein the distance measurement frame includes measurement of multiple distance measurement frames; each distance measurement frame corresponds to at least one scattering detection; and the scattering detection is performed before each distance measurement frame.

12. The time of flight ranging system according to claim 11, wherein the scattering detection is performed before each distance measurement frame; or the distance measurement frame includes at least one close-range measurement subframe and at least one far-range measurement subframe, the scattering detection is performed between the close-range measurement subframe and the far-range measurement subframe, to correct initial measurement values output by at least part of the pixel units in the far-range measurement subframe.

* * * * *